No. 612,223. Patented Oct. 11, 1898.
J. AIREY.
PACKING FOR PISTONS.
(Application filed Oct. 8, 1897.)
(No Model.) 2 Sheets—Sheet 1.
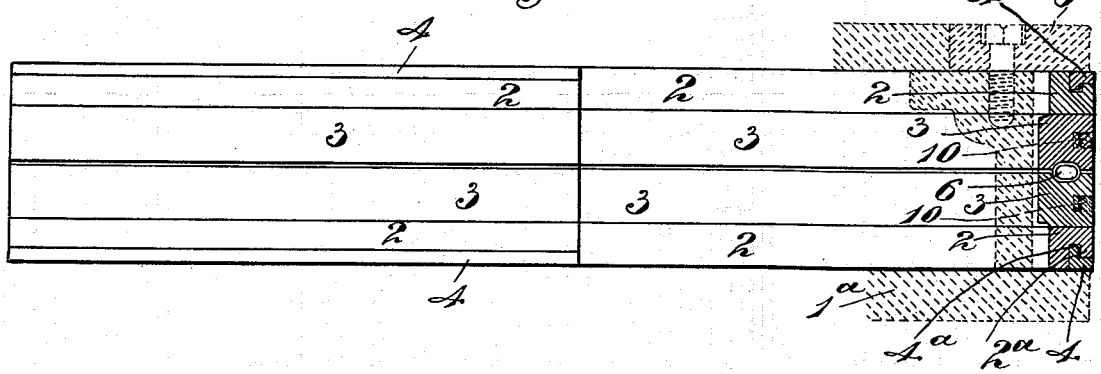
Fig. 1.
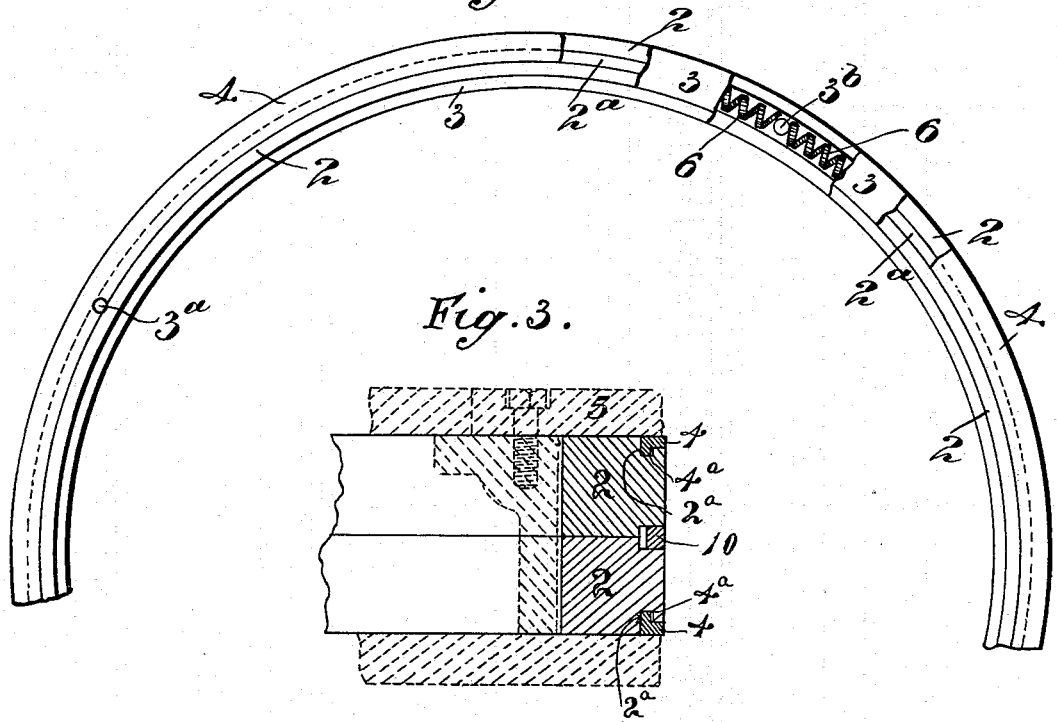
Fig. 2.
Fig. 3.
Witnesses.
Geo. E. Fitch.
Geo. M. Copenhaver.
Inventor
James Airey
per Herbert E. Peck
Atty No. 612,223.  
J. AIREY.  
PACKING FOR PISTONS.  
(Application filed Oct. 8, 1897.)  
Patented Oct. 11, 1898.
(No Model.)  
2 Sheets—Sheet 2.
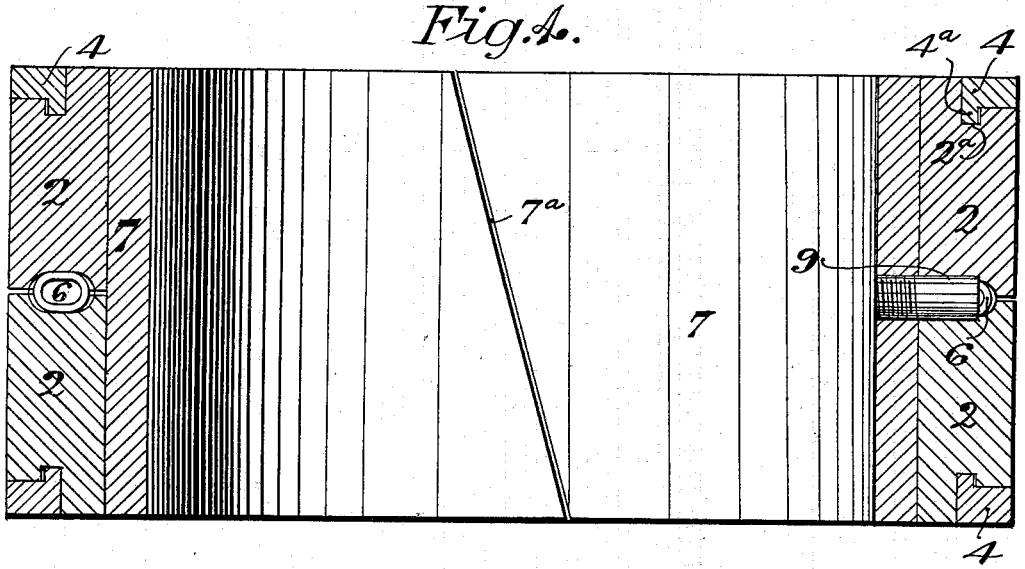
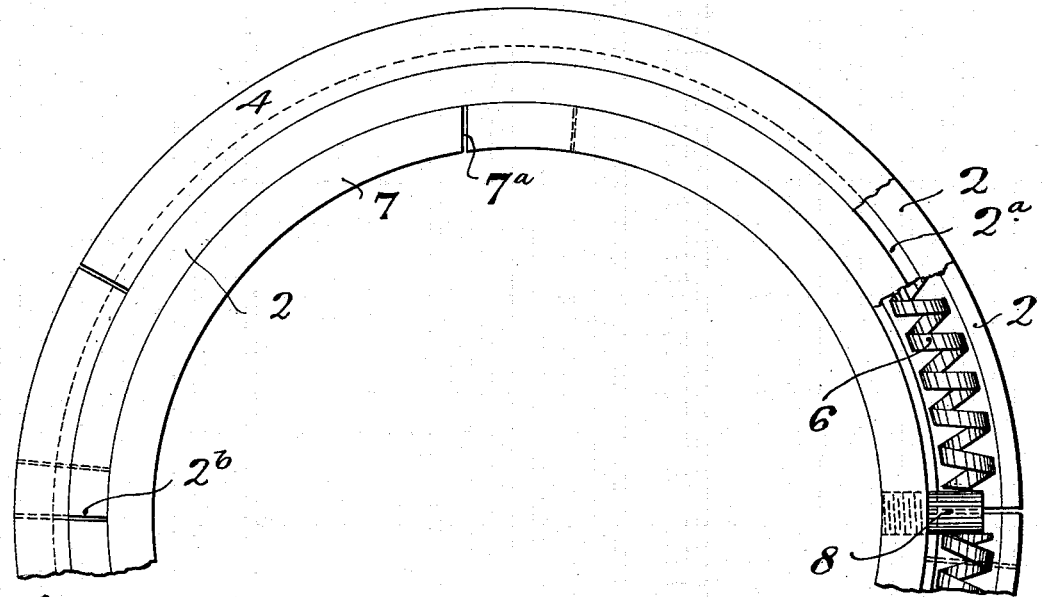

UNITED STATES PATENT OFFICE.

JAMES AIREY, OF WEST HARTLEPOOL, ENGLAND.

PACKING FOR PISTONS.

SPECIFICATION forming part of Letters Patent No. 612,223, dated October 11, 1898.

Application filed October 8, 1897. Serial No. 654,503. (No model.) Patented in England January 3, 1896, No. 187.

*To all whom it may concern:*

Be it known that I, JAMES AIREY, a subject of the Queen of Great Britain and Ireland, residing at West Hartlepool, in the county of Durham, England, have invented Improved Packing for Pistons and the Like, (for which I have secured a patent in Great Britain, No. 187, dated January 3, 1896,) of which the following is a specification.

My invention has reference to improved means for preventing escape of fluid between pistons, piston-valves, and the like and the walls or surfaces in contact with which they are designed to travel in a practically fluid-tight manner. According thereto the piston or other body is provided with a ring of suitable metal, such as steel, which is fitted with segments or packing-pieces of a metal that will at a given temperature expand to a greater extent than the metal composing the ring, the said segments or packing-pieces being fitted to the outside edge or edges of the ring, in which there are recesses to receive the segments or packing-pieces, which may be formed with grooves, dovetails, or projections at their sides next to the ring and which are so fitted into the ring as to prevent their lateral displacement and in such wise that owing to their greater expansion a practically fluid-tight contact with the cylinder-wall or rubbing-surface may be obtained with as little friction as possible. If desirable, the ring itself may be either cut at one place or divided into two or more part rings. There may be two or more such rings as above referred to, and segments or packing-pieces may be applied to any one or more or to all of such rings, as desired. As will be obvious, a single packing-piece in the form of a packing-ring cut in one place may be used in lieu of several segments or packing-pieces.

Figure 1 of the accompanying drawings shows my improved packing, partly in side elevation and partly in section, applied to a piston, part of which is shown in dotted lines. Fig. 2 shows the packing in plan or top view, parts thereof being broken away. Fig. 3 is a part vertical section showing a modification. Fig. 4 shows in longitudinal section a packing suitable for a piston-valve, and Fig. 5 shows this packing in end elevation with parts thereof broken away.

In the example shown in Figs. 1 and 2 the piston 1 is provided with two rings 2 2 of flexible metal, such as steel, that are separated by two other metal rings 3 and the outer edge of each of which is recessed and fitted with a ring composed of segments or packing-pieces 4 of metal, such as brass or gun-metal, the coefficient of expansion of which is greater than that of the corresponding ring 2. These segments or packing-pieces 4, owing to their position and also to the greater expansion of the brass or gun-metal than the steel or even ordinary cast-iron rings 2, have the effect of practically preventing wear of the rings 2.

On account of the packing-pieces 4 having a greater coefficient of expansion than the rings 2 when in use the greater relative expansion of the said packing-pieces causes them to tend to overlap or assume a greater diameter than the rings 2, and thus bear with greater pressure than the latter upon the wall of the cylinder. By this means the wear due to friction is taken chiefly upon the packing-pieces instead of upon the rings 2, and likewise the rings 2 are prevented from cutting the cylinder.

The segments or packing-pieces are provided with projections $4^a$, that fit into corresponding grooves $2^a$ in the rings 2, so as to prevent lateral displacement of the segments or packing-pieces, while permitting them to expand to a greater extent than the said rings when heated in order to form a practically fluid-tight joint with the wall of cylinder in which the piston is to work, as hereinbefore stated. The segments or packing-pieces are kept in place endwise on the one side by the flange or rim $1^a$ on the piston-body and on the other side by a junk-ring 5, against which parts they may be respectively pressed by the action of coiled metal springs 6 of oval cross-section confined between the rings 3. In the example shown each ring 2 when being made has a piece cut therefrom and is then compressed by a band and turned to shape while in a state of compression, so that when it is in position for use it will bear with the requisite pressure against the wall of the cylinder.

The rings 3 are not cut. The rings 2 and segments or packing-pieces 4 are so relatively arranged that the lines of division therein break joint, and they are kept in such positions by suitable means, such as pins $3^a$, Fig. 2, one of which is fitted between each ring 2 and one of the corresponding segments or packing-pieces 4. $3^b$ are pins between the adjacent ends of the springs 6.

Each ring 2 may be undivided and made in one piece with its adjacent ring 3, so as to form one wide ring, as shown in Fig. 3, and the interposed springs 6 may be dispensed with also, as shown in Fig. 3, so that the rings will be pressed neither endwise nor radially by spring-pressure.

In some cases when a ring or rings to which the packing segments or pieces are applied is or are divided I arrange concentrically within it or them another ring or rings in compression and so positioned as to overlap or break joint with the outer ring or rings, so as to prevent the passage of fluid past the outer ring or rings between the abutting ends of its or their component parts to the piston or other body. The inner ring or rings being of flexible material and in a state of compression will by lateral extension keep the outer ring or rings in close contact with the surface against which it or they is or are designed to travel.

Figs. 4 and 5 show a packing thus constructed and suitable for a piston-valve.

2 2 are metal rings carrying segments or packing-pieces 4 of metal of the kind hereinbefore mentioned. They may be pressed apart by interposed springs 6, as in Figs. 1 and 2, or these springs may be omitted. The rings 2 are divided, as shown at $2^b$, and are fitted internally with another divided ring 7, that is in compression and so arranged that its line of division $7^a$ breaks joint with the joints $2^a$ in the rings 2. This relative position of the rings may be maintained by a pin 8, that is fixed to the ring 7 and enters a hole 9, formed between the adjacent surfaces of the rings 2, as shown in Fig. 4.

When my invention is applied to pistons working more especially in high-pressure cylinders, an additional ring or rings of various well-known types—for instance, such as the Ramsbottom rings—may be fitted into a recess or recesses cut in the face of the outer ring, as shown at 10 10 in Fig. 1, as a further security against leakage and excessive friction.

What I claim is—

1. Packing for a piston or the like comprising a packing-ring, and a packing-piece made of a metal having a greater coefficient of expansion than the metal composing said ring and fitted into a recess in the latter so that it cannot move bodily in a radial direction relatively to said ring but will, when heated, expand to a greater extent and so as to overlap said ring substantially as herein described.

2. Packing for pistons and the like comprising one or more rings of suitable metal such as steel, and segments or packing-pieces of a metal such as brass having a greater coefficient of expansion than the metal composing the ring or rings, the inner portions of said segments or packing-pieces being so fitted to said ring or rings as to prevent lateral displacement of the segments or packing-pieces relatively to such ring or rings while permitting them to expand to a greater extent than said ring or rings when heated and to then project radially beyond the same, substantially as herein described for the purpose specified.

3. Packing for pistons and the like comprising one or more divided spring packing-rings of suitable material such as steel or cast-iron, and segments or packing-pieces of a metal such as brass having a greater coefficient of expansion than the metal comprising the ring or rings, said segments or packing-pieces being fitted in a recess or recesses in the outer edge or edges of the ring or rings and being provided at their inner portions with projections that fit corresponding grooves in the said recess or recesses and hold the said segments or packing-pieces in place radially while permitting them to expand to a greater extent than said ring or rings when heated, substantially as herein described for the purpose specified.

4. Packing for pistons and the like comprising rings of suitable metal such as steel or cast-iron, segments or packing-pieces of metal having a greater coefficient of expansion than the metal composing the rings, said segments being fitted in recesses to the outer edges of the rings and being provided with projections that fit corresponding grooves in the said recessed portions of the rings, and springs arranged between said rings and adapted to press the same endwise, substantially as herein described.

5. Packing for pistons and the like comprising a split or divided ring of suitable metal such as steel or cast-iron, segments or packing-pieces of metal having a greater coefficient of expansion than the metal composing the ring, said segments or packing-pieces being fitted in a recess or recesses to the outer edge or edges of the ring, so that they cannot be displaced laterally but can expand laterally to a greater extent than said ring, and a divided spring-ring arranged within and so as to break joint with the outer ring and acting to expand the latter ring, substantially as herein described.

6. Packing for pistons and the like comprising split or divided rings of suitable metal such as steel or cast-iron, segments or packing-pieces fitted in recesses in the outer edges of said rings and formed of metal having a greater coefficient of expansion than the metal comprising the rings a spring arranged between said rings and adapted to press the same endwise, and a divided spring-ring arranged within and so as to overlap or break joint with the outer rings and acting to expand the latter rings, substantially as herein described.

In testimony whereof I have signed my name to this specification in the presence of two subscribing witnesses.

JAMES AIREY.

Witnesses:
F. H. BENNETT,
GEO. SMITH.